UNITED STATES PATENT OFFICE.

LORENZ ACH AND THEODOR SUTTER, OF MANNHEIM, GERMANY, ASSIGNORS TO C. F. BOEHRINGER & SOEHNE, OF MANNHEIM-WALDHOF, GERMANY.

SALICYLIC-ACID DERIVATIVE AND PROCESS OF MAKING THE SAME.

No. 922,995.     Specification of Letters Patent.     Patented May 25, 1909.

Application filed May 20, 1908. Serial No. 433,859. (Specimens.)

*To all whom it may concern:*

Be it known that we, LORENZ ACH and THEODOR SUTTER, citizens of Germany and Switzerland, respectively, residing at Mannheim, Germany, have invented certain new and useful Improvements in Salicylic-Acid Derivatives and the Process of Making the Same; and we do hereby declare the following to be a full, clear, and exact description of the invention, such as will enable others skilled in the art to which it appertains to make and use the same.

The object of the present invention is to obtain a substitute for salicylic acid which, among other things, is adapted for therapeutic use in the place of the same.

In the literature relating to this art a large number of experiments and attempts have been described which all have for their object the preparation of salicylic acid anhydrid from salicylic acid or its compounds. These experiments have resulted in a variety of products which may be classed as neutral and acid products in view of their behavior in the presence of alkalies and alkaline carbonates in the cold. The first group of compounds have been studied and examined in recent times by Anschütz (see *Liebig Ann.* 273 p. 806) and by Einhorn (see *Berichte* 34, p. 2951) and others. They have reported methods for obtaining pure crystalline compounds such as for example, disalicylid, tetrasalicylid or polysalicylid. All these compounds are obtained from salicylic acid by the separation of one molecule of water from one molecule of salicylic acid. When these experiments did not involve so great a splitting off of water there have been obtained products having acid properties and in the form of unsatisfactory amorphous masses whose chemical composition was not constant and which were formed by the aggregation of several molecules of salicylic acid in chain-like groupings (see *Beilstein* Vol. II p. 1498). In our experiments and researches in this field we have succeeded in obtaining in a pure state a hitherto unknown acid anhydrid of salicylic acid which is formed of two molecules of acid by the splitting off of one molecule of water therefrom. This body we have obtained in a manner to assure a good yield and as a distinct compound by the action of condensing agents on salicylic acid, or a salicylate. This new anhydrid melts at from 147 to 148° C. and has the empiric formula $C_{14}H_{10}O_5$ and the structural formula

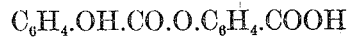

and it is therefore properly designated as salicylo-salicylic acid.

The properties of this new compound are very marked. In cold alcohol and ether, the same is soluble only with difficulty, but is readily soluble in these bodies when heated. It is soluble in about 6.5 parts by weight of boiling benzene and is immediately thrown out of such solution on cooling in the form of coarse crystals, such precipitation being almost complete. These properties serve to distinguish the present new compound in a very striking manner from the amorphous substances referred to in *Beilstein* Vol. II, p. 1498 under the name of salicylo-salicylic acid.

The new anhydrid is soluble in water only with extreme difficulty, even when boiling the same. On the other hand, it is very readily dissolved in cold aqueous solutions of alkalies. On acidifying such solutions it is again precipitated unchanged. The new compound is modified by heating the same to a temperature near its melting point for a sustained period of time and by condensing agents.

The new product may be obtained in sufficient yield if the necessary precautions are taken, that during the course of the reaction the salicylo-salicylic acid is not further changed as it is produced. In order to attain this end it is necessary to guard against too extensive a condensation and for this purpose various conditions must be maintained according to the nature of the condensing agent and the starting material.

In connection with the condensing agent the various properties of the same are to be considered such as its volatility and the rapidity with which it reacts.

We have found that one may use only so much of the condensing agent as is necessary to split off one molecule of water from two molecules of the starting material which may be salicylic acid or a neutral or basic salicylate *i. e.* a compound of salicylic acid with an inorganic or an organic base, such for instance, as pyridin or dialkylanilin. In many cases this checking action is aided by maintaining the temperature at a low point. In many cases also it is advantageous though not strictly necessary to dilute the mixture of reagents with solvents such as for instance the aromatic hydrocarbons among which are to be mentioned in particular benzene and toluene. The salicylo-salicylic acid thus obtained in crystalline form is tasteless and free from any irritating action on the stomach and it is readily and completely split up in the intestine. It is, therefore, exceedingly well adapted to take the place of salicylic acid as a medicine.

The following examples will serve to elucidate my invention.

Example 1: A solution of 5 parts by weight of salicylic acid in 5.2 parts of dimethyl anilin and 1.5 parts benzene is prepared, and into this a solution of one part by weight of phosphorus-trichlorid in 1.5 parts of benzene is introduced in drops while stirring and while maintaining the whole cool by the circulation of water at ordinary temperature. The mixture thus obtained is allowed to stand for several days at ordinary atmospheric temperature. Thereupon the mass is introduced into an excess of hydrochloric acid of substantially 12% strength while constantly stirring the mass. Several hours after the completion of this treatment the crystalline mixture of salicylic acid and salicylo-salicylic acid which is formed is separated from the bath by siphoning or otherwise removing the liquid portion and by boiling the said crystalline mass with water. By this latter treatment the salicylo-salicylic acid is directly obtained in the form of coarse crystals having a melting point of from 147 to 148° C. These crystals are found to be chemically pure.

The reaction which takes place in forming the new compound is expressed in the following equation:

$$2C_6H_4(OH)(COOH) - H_2O = OH.C_6H_4.COO.C_6H_4.COOH.$$

Example 2: 5 parts by weight of salicylic acid are dissolved in 4.4 parts by weight of dimethyl anilin, and into this solution 1 part by weight of phosphorus-trichlorid is slowly introduced in drops, the solution being constantly cooled and stirred during the introduction of the condensing agent. After allowing the mixture so prepared to stand for several days at atmospheric temperature the same is made to undergo the further treatment described under Example 1.

Example 3: Into a solution of 10 parts by weight of salicylic acid in 12 parts by weight of dimethyl-anilin and 10 parts by weight of benzene which is maintained cool by circulation of water, a solution of two parts by weight of phosphorus-trichlorid in 8 parts by weight of benzene is introduced dropwise while stirring the whole. The mixture is allowed to stand from ten to twelve hours at atmospheric temperature and thereafter it is heated to about 80° C. and maintained at this temperature for from one to two hours. To this mass there is then added an excess of a saturated solution of sodium carbonate in an amount sufficient for complete combination with the condensation product whereupon the watery layer is separated from the benzene-dimethyl-anilin solution. The sodium solution is now acidified, whereupon the resultant salicylo-salicylic acid precipitates in the form of a quickly solidifying mass. This precipitation takes place at the commencement of the acidification, while at the end of this treatment the excess of salicylic acid is thrown out. The precipitate is then boiled with water and the solid residuum is dissolved in benzene. From this solution the salicylic acid anhydrid or salicylo-salicylic acid is obtained in pure state.

Example 4: A solution of 14 parts by weight of salicylic acid and 12 parts by weight of dimethyl-anilin in 25 parts by weight of benzene is prepared and cooled by means of ice. Into this cooled solution there is introduced slowly a 10 % solution of two parts by weight of phosgene (carbonyl-chlorid, $COCl_2$) in benzene, care being taken that atmospheric moisture is excluded. After allowing this mixture to stand at atmospheric temperature for from ten to twelve hours the dimethyl anilin is eliminated from the same by extraction with an aqueous acid solution. The separated benzene solution is stirred with an amount of sodium carbonate solution not sufficient for complete neutralization. By this means the new salicylic acid anhydrid which is dissolved in the benzene solution may be freed from salicylic acid which remains in aqueous solutions. The new anhydrid is obtained from the benzene solution by distilling off the benzene.

Example 5: A mixture of 14 parts by weight of salicylic acid with 12 parts by weight of dimethyl anilin is maintained cool and into this mixture is introduced a solution of 3 parts by weight of phosphorus oxychlorid in 10 parts by weight of benzene. After having allowed the mass to stand for 12 hours at ordinary temperature the same is further treated as described in Example 4.

Example 6: 10 parts by weight of salicylic acid are mixed with 10 parts by weight of dimethyl anilin, and to this mixture is slowly added a solution of 3 parts by weight of thionylchlorid $SOCl_2$ in 5 parts by weight of toluene, while cooling with ice and stirring. The rest of the treatment proceeds as in Examples 4 and 5.

Example 7: 14 parts by weight of salicylic acid are dissolved in 18 parts by weight of pyridin ($C_5H_5N$) and cooled with ice and during such cooling 4 parts of phosgene dissolved in a 5% solution of benzene is added while stirring the whole. This mixture is then allowed to stand for twelve hours at ordinary temperature, whereupon it is heated on the water bath for one or two hours and thereupon further treated as in Example 4.

Example 8: 1 part by weight of thoroughly dried, finely powdered dipotassium salicylate ($C_6H_4.OK.COOK$) is suspended in from 3 to 4 parts of benzene and phosgene is rapidly introduced into this mixture. Heat is liberated and an almost clear solution results. This solution is then cooled, whereupon potassium-chlorid is thrown out. The new salicylic acid anhydrid is then extracted by means of a sodium-carbonate solution and the extract is then purified as in Example 4.

Example 9: 10 parts by weight of dry mono-sodium salicylate ($C_6H_4.OH.COONa$) are suspended in 10 parts by weight of benzene and to this mixture two parts by weight of phosphorus oxychlorid are added slowly while well stirring. The temperature is then slowly raised to 50° C. and the mass is maintained at this temperature for four hours while stirring. After filtering the solution is treated as in Example 3.

Example 10: 10 parts by weight of salicylic acid are suspended in 10 parts by weight of toluene and boiled with reflux cooling together with 2 parts by weight of phosphorus oxychlorid for five hours. The resultant mass is then treated with sodium carbonate solution and the extract so formed treated as above for purification.

It will be seen from the above examples, that under this invention a starting compound containing the salicylic acid radical, such as salicylic acid or a salicylate, is acted on by a condensing agent, such as phosphorus trichlorid, phosphorus-oxychlorid, phosgene or thionyl-chlorid, such condensing agent being present in quantities less than an excess of the amount necessary to split off one molecule of water from two molecules of the said starting compound. Moreover it is to be noted that it is preferable to dilute, that is to say, to suspend or to dissolve such starting compound in a suitable solvent, preferably an organic solvent, such as benzene, toluene, a mixture of the same with an alkyl-anilin, or other solvent aromatic hydrocarbon compound, although such dilution is not indispensable. It is also preferable to cool the reaction mixture to produce the new anhydrid.

The yield in carrying out the process varies considerably in the different examples. We have been able to obtain as high as 80%.

What we claim and desire to secure by Letters-Patent is:—

1. The process which consists in submitting a starting compound containing the salicylic acid radical to the action of a condensing agent in a quantity not exceeding the amount necessary to split off one molecule of water from two molecules of the salicylic acid radical.

2. The process which consists in submitting salicylic acid to the action of a condensing agent in a quantity not exceeding the amount necessary to split off one molecule of water from each two molecules of the salicylic acid.

3. The process which consists in submitting a starting compound containing the salicylic acid radical together with a diluting agent to the action of a condensing agent not in excess of the quantity necessary to split off one molecule of water from each two molecules of the salicylic acid radical.

4. The process which consists in submitting salicylic acid together with a diluting agent to the action of a condensing agent not in excess of the quantity necessary to split off one molecule of water from each two molecules of the salicylic acid radical.

5. The process which consists in submitting a starting compound containing the salicylic acid radical in solution to the action of a condensing agent in a quantity not in excess of the amount necessary to split off one molecule of water from each two molecules of the starting compound.

6. The process which consists in submitting salicylic acid in solution to the action of the condensing agent in a quantity not in excess of the amount necessary to split off one molecule of water from each two molecules of the salicylic acid.

7. The process which consists in submitting a starting compound containing the salicylic acid radical together with an organic solvent of such compounds to the action of a condensing agent not in excess of the amount necessary to split off one molecule of water from each two molecules of said starting compound.

8. The process which consists in submitting salicylic acid together with an organic solvent of the same to the action of a condensing agent, said condensing agent being added in quantities not in excess of the amount necessary to split off one molecule of water from each two molecules of the salicylic acid.

9. The process which consists in submitting a starting compound containing the salicylic acid radical together with a hydrocarbon solvent of the aromatic series to the action of a condensing agent, said condensing agent being added in quantities not in excess of the amount necessary to split off one molecule of water from each two molecules of salicylic acid.

10. The process which consists in submitting a starting compound containing the salicylic acid radical together with benzene and dimethyl-anilin to the action of a condensing agent, said condensing agent being added in quantities not in excess of the amount necessary to split off one molecule of water from two molecules of the starting compound.

11. The process which consists in submitting a starting compound containing the salicylic acid radical and dimethyl-anilin diluted with benzene to the action of a quantity of phosphorus-trichlorid not in excess of the amount necessary to split off one molecule of water from two molecules of the starting compound, allowing the mixture to stand for a sustained period of time, and then adding a hydrochloric acid solution to throw out the resultant salicylic acid anhydrid mixed with an excess of salicylic acid.

12. The process of separating salicylic acid anhydrid having the formula given above from salicylic acid which consists in boiling the mixture of the two with water.

13. The process which consists in submitting a starting compound containing the salicylic acid radical to the action of a condensing agent in a quantity not in excess of the amount necessary to split off one molecule of water from two molecules of the starting compound, separating the mixture of salicylic acid and salicylic acid anhydrid thus produced from the bath and boiling said mixture with water.

14. The process which consists in submitting a starting compound containing the salicylic acid radical to the action of a condensing agent not in excess of the quantity necessary to split off one molecule of water from each two molecules of the starting compound while maintaining a low temperature.

15. The process which consists in submitting a starting compound containing the salicylic acid radical in solution to the action of a condensing agent not in excess of the quantity necessary to split off one molecule of water from each two molecules of the starting compound while maintaining a low temperature.

16. As a new chemical compound, a salicylic acid anhydrid whose composition is represented by the structural formula:

$$C_6H_4.OH.O.C_6H_4.COOH$$

and which has the following properties: It is soluble with difficulty in cold alcohol or ether, but readily soluble therein under heat; it is soluble in substantially 6.5 parts by weight of boiling benzene and thrown out from such solution in the form of coarse crystals, its boiling point is 147 to 148° centigrade, in crystalline form it is tasteless and partakes of the therapeutic properties of salicylic acid.

In testimony whereof we hereunto affix our signatures in the presence of two witnesses.

LORENZ ACH.
THEODOR SUTTER.

Witnesses:
  Jos. H. Leute,
  Teresa Catturani.